United States Patent [19]

Siewert et al.

[11] Patent Number: 4,629,350
[45] Date of Patent: Dec. 16, 1986

[54] TOLERANCE COMPENSATING JOINT

[75] Inventors: Robert L. Siewert, Benton Harbor; Edmund K. Varnelis, St. Joseph, both of Mich.

[73] Assignee: Lark Equipment Company, South Bend, Ind.

[21] Appl. No.: 681,725

[22] Filed: Dec. 14, 1984

[51] Int. Cl.[4] .............................................. F16C 11/00
[52] U.S. Cl. ........................................ 403/11; 403/16; 403/161; 403/162; 403/157; 414/722
[58] Field of Search .............. 403/161, 162, 163, 157, 403/158, 16, 14, 11; 414/722, 723; 16/228, 340, 386, 381

[56] References Cited

U.S. PATENT DOCUMENTS

| | | | |
|---|---|---|---|
| 2,459,221 | 1/1949 | Farrington | 403/16 |
| 2,899,222 | 8/1959 | Ross | 403/16 |
| 3,953,141 | 4/1976 | Koch | 403/259 |
| 3,997,274 | 12/1976 | Iverson | 403/14 X |
| 4,022,536 | 5/1977 | Piepho et al. | 403/16 |
| 4,188,146 | 2/1980 | Stecklein | 403/158 |
| 4,192,622 | 3/1980 | Stecklein | 403/163 X |
| 4,243,341 | 1/1981 | Kabay et al. | 403/16 |
| 4,398,862 | 8/1983 | Schroeder | 403/162 X |
| 4,507,005 | 3/1985 | Siewert et al. | 403/162 X |

Primary Examiner—Cornelius J. Husar
Assistant Examiner—Joseph A. Fischetti
Attorney, Agent, or Firm—Kenneth C. Witt; John C. Wiessler

[57] ABSTRACT

A joint for connecting together two frame members of a machine for relative movement wherein one of the frame members has flexible portions which during assembly of the joint are flexed to enable the joint to be assembled without shims and without exceeding predetermined maximum stresses on the parts of the joint.

4 Claims, 1 Drawing Figure

TOLERANCE COMPENSATING JOINT

This invention is related to the invention of U.S. application Ser. No. 681,724, now abandoned which was filed on the same date, in that the two inventions can be utilized in close association in the same machine.

BACKGROUND OF THE INVENTION

1. Field of the Disclosure

This invention concerns a joint for connecting together two frame members of a machine to provide relative movement, either pivotal or rotary, between the two frame members.

2. Description of the Prior Art

U.S. Pat. No. 3,953,141 Koch shows a construction for locking the inner race of a spherical bearing assembly to a shaft, comprising an end plate which is secured to the shaft and which abuts the inner race of the bearing. The two abutting surfaces are either nonplanar or else they are planar surfaces which are not perpendicular to the axis of the bearing race.

SUMMARY OF THE INVENTION

This invention is a joint for machinery which, without the use of shims, makes it possible to assemble the joint and to adjust it for proper operation regardless of whether the manufacturing variations in the parts which make up the joint result in an amount which is more or less than the nominal amount, the nominal amount being the dimension specified on the design or manufacturing drawings.

If the space between the two flanges of a bifurcated frame member is less than the nominal amount, a retainer cap which is mounted on one of the flanges contacts the inner race of a bearing. This causes the bearing race to contact a spacer. The spacer contacts the other flange, flexing the flanges away from each other and making a solid connection. If the space between flanges is more than nominal then a connection between the one of the flanges and one end of the pin is utilized to pull the two flanges toward each other to form a solid connection.

BRIEF DESCRIPTION OF THE DRAWING

The single FIGURE of the drawing is a vertical sectional view except for the pin through a joint embodying the present invention.

DESCRIPTION OF THE PREFERRED EMBODIMENT

Figure 1:
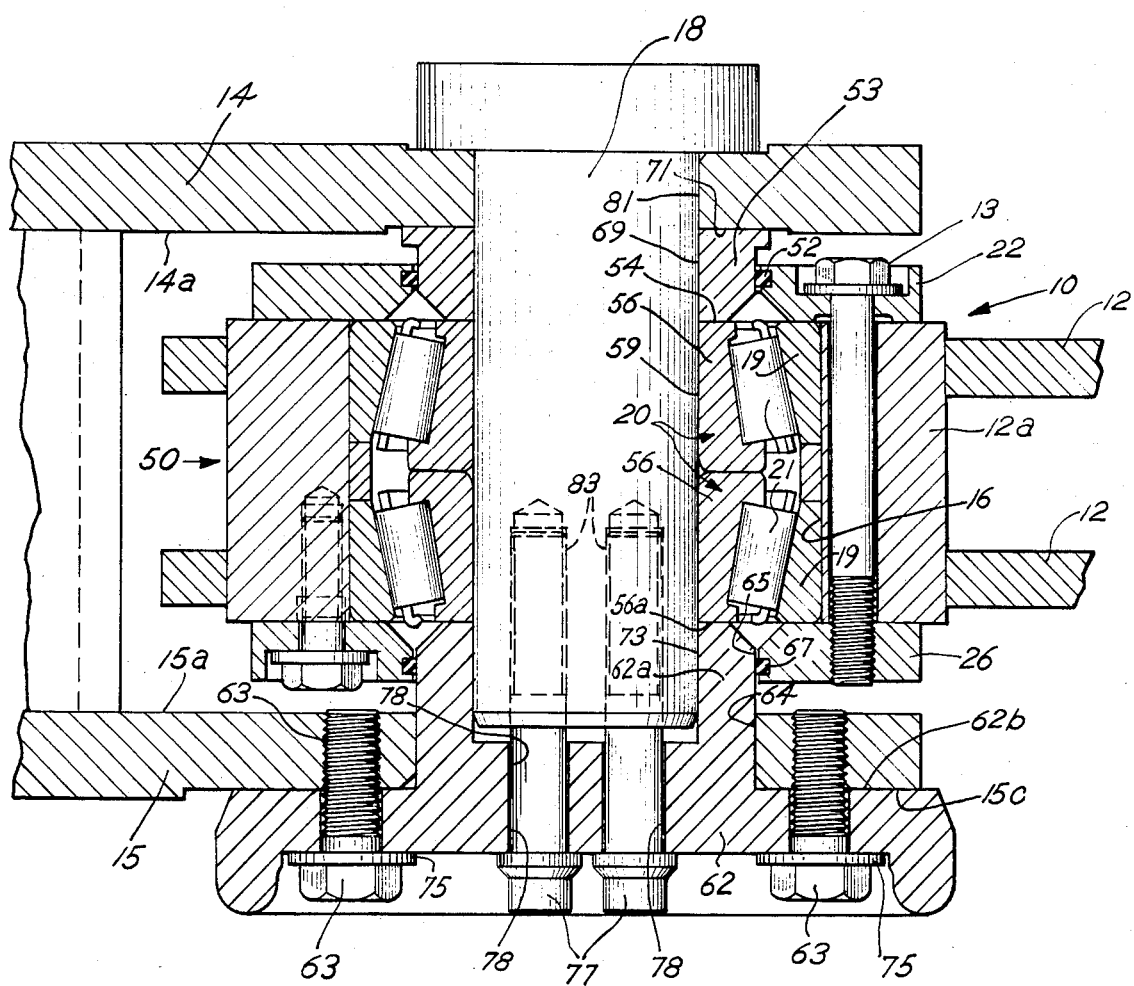

The structure of the said related invention is shown in the present drawing where it is indicated by the numeral 10. Such other invention in combination with the present invention connects together two frame or structural members of a machine which pivot relative to each other during operation of the machine. One of the machine frame members which is bifurcated is indicated at 12,12 and the other, which also is bifurcated, is indicated at 14,15. Member 12,12 includes a boss portion 12a, and such boss portion has an opening 16 within which a pin 18 is located, the pin 18 being secured to member 14,15 by means of a structure which is disclosed herein. There is a bearing assembly 20 around the pin, and a distortable retainer ring 22 which in part secures the bearing assembly 20 to the member 12,12.

The structure of said related invention provides for joining the two frame members for relative movement between them without the use of shims. This is accomplished by means of distortable upper retainer ring 22 which is coaxial with and surrounds the pin 18 and is secured to frame member 12,12 by means of cap bolts 13 which extend through upper retainer ring 22, apertures in boss 12a, and are threaded into a lower retainer ring 26. A two row tapered roller bearing assembly 20 is illustrated, and the outer races or cups 19,19 of this bearing are captured between the rings 22 and 26 and thus are held solidly in place on member 12,12. The inner races or cones 56,56 of the roller bearing assembly 20 are secured to the frame member 14,15 in accordance with the present invention. Thus the tapered rollers 21,21 of bearing assembly 20 provide a dynamic joint for relative movement between frame member 12,12 and frame member 14,15.

The joint structure of the present invention is indicated generally on the drawing by the numeral 50. In the assembly of a joint structure according to this invention the bearing assembly 10 is assembled to frame member 12,12 in accordance with said related invention, or other functionally equivalent means may be utilized if desired. Then, seals 52 and 67 are installed in the bearing assembly's upper and lower retainer rings 22 and 26 respectively, and spacer 53 is pushed downwardly through the upper seal 52 until it seats tightly against surface 54 on inner bearing race 56. In this description the joint use of the numerals 14,15 refers to the entire structural or frame member of which flanges 14 and 15 are parts. The use of 14 or 15 separately refers to the individual flanges 14 and 15 respectively.

The frame member 12,12 with other parts assembled thereon as stated above is then positioned in alignment with the flanges 14 and 15 of the other frame member, aligning the opening 59 through bearing assembly 10 with openings 81 and 64 in flanges 14 and 15 respectively. Lower retainer cap 62 is then installed through opening 64 in flange 15, by inserting boss portion 62a through opening 64 and seal 67, until the cap 62 abuts tightly against surface 56a of lower bearing race 56, or the cap shoulder 62b seats tightly against the bottom surface 15c of the lower frame furcation 15. Cap 62 is then secured in this position by six cap bolts 63 and flat washers 75. Pin 18 is then installed through bore 81 in upper frame portion 14, the bore 69 through spacer 53, the bore 59 in bearing assembly 20 and into lower frame portion 15, aligning tapped holes 83 in the pin with through bores 78 in cap 62. The pin is then secured in position by four cap bolts 77 which extend through bores 78 in retainer 62 and are threaded into pin 18 as indicated at 83.

After frame members 12,12 and 14,15 thus have been joined together, the cap bolts 63 are torqued to specification, that is, a predetermined specified amount. If the dimension between the inner confronting surfaces 14a and 15a of the two flanges 14 and 15 of the bifurcated member is less than the nominal amount, the retainer cap boss 62a seats tightly against surface 56a of lower bearing race 56 and pushes the bearing assembly 20 and frame 12,12 upwardly until spacer 53 contacts the bottom machined surface 71 of the upper frame portion 14. As lower cap bolts 63 are brought to the specified torque the frame portions 14 and 15, which are resilient, flex apart until the upper surface 62b of retainer cap 62 seats tightly against mating machined surface 15c of frame portion 15.

If the dimension between the surfaces 14a and 15a is more than nominal, tightening or torquing the cap screws 63 to force retainer cap 62 upwardly causes boss 62a to contact surface 56a on bearing race 56, and push the frame 12,12 upwardly until the upper surface 62b on cap 62 seats tightly against machined surface 15c of frame portion 15, leaving a small gap between spacer 53 and bottom surface 71 of upper furcation 14.

After lower retaining cap bolts 63 have been tightened to specification, pin retaining cap bolts 77 are tightened to specification. This secures the pin 18 solidly to flange 15 and also flange 14. If the frame 14,15 has been assembled with the tolerance for the dimension between flanges 14 and 15 less than nominal, the said two members will be solidly tied together by capturing the inner races 56 of the bearing assembly between spacer 53 and lower retaining cap 62, allowing both flanges 14 and 15 to share thrust and other loads.

If the joint is assembled with the tolerance for the distance between flanges 14 and 15 more than nominal, tightening the pin retaining cap bolts 77 to specification draws the flanges 14 and 15 together until spacer 53 seats tightly against the machined surface 71 of upper structural portion 14, capturing the bearing assembly between spacer 53 and lower retaining cap 62, again allowing both flanges 14 and 15 to share thrust and other loads.

While we have illustrated and described the best mode contemplated for carrying out our invention it will be appreciated that modifications may be made. Accordingly, it should be understood that we intend to cover by the following claims all such modifications which fall within the true spirit and scope of our invention.

We claim:

1. A joint for connecting together two frame members of a machine for relative movement,
    one of said frame members including a bifurcated portion having spaced apart resilient flanges, and a pair of aligned openings in said flanges,
    the said two flanges spaced apart a nominal distance between the inner confronting surfaces of said flanges,
    the other said frame member located in part between said flanges and having an opening therethrough, comprising
    a pin extending into said three openings,
    a bearing assembly around said pin, and
    screw connection means for causing said flanges to flex during assembly of said joint,
    said screw connection means comprising a retainer cap seated in one of the openings in one of said resilient flanges and secured by cap bolts threaded into one of said flanges through openings in said retainer cap,
    a portion of said retainer cap extending axially along said pin and abutting said bearing assembly, and
    a spacer between said bearing assembly and the other said flange,
    the flanges flexing toward each other if the initial spacing between the flanges is greater than a nominal amount, and
    the flanges flexing away from each other if the initial spacing between the flanges is less than the nominal amount.

2. A joint for connecting together two frame members of a machine for movement relative to each other,
    one of said frame members including a bifurcated portion having spaced apart resilient flanges,
    a pair of aligned openings in said flanges,
    the said two flanges spaced apart a nominal distance between the inner confronting surfaces of the flanges,
    the other said frame member located in part between said flanges and having an opening therethrough in alignment with said pair of openings, comprising
    a headed pin extending into said three openings,
    a bearing assembly around said pin,
    the head of said pin engaging the outer surface of one of said flanges,
    first connection means for causing said flanges to flex toward each other during assembly of said joint if the initial spacing between flanges is greater than said nominal amount,
    said first connection means including a retainer cap and at least one cap bolt extending through said retainer cap in contact with the outer surface of said retainer cap and threaded into the end of said pin, and
    second connection means for causing said flanges to flex away from each other during assembly of said joint if the initial spacing between flanges is less than said nominal amount,
    said second connection means including a boss portion on said retainer cap engaging said bearing assembly,
    a spacer between said bearing assembly and one said flange, and
    at least one additional cap bolt extending through said retainer cap in contact with the outer surface of said retainer cap and threaded into the other said flange.

3. A method for connecting together two frame members of a machine for movement relative to each other,
    one of said frame members including a bifurcated portion having spaced apart resilient flanges,
    the said two flanges spaced apart a nominal distance between the inner confronting surfaces of the flanges,
    a pair of aligned openings in said flanges,
    the other said frame member adapted to be located in part between said flanges and having a third opening therethrough located so as to be in alignment with said pair of openings when said frame members are connected, the method comprising
    installing a bearing assembly in said third opening,
    locating said other frame member in part between said two flanges of the one frame member,
    inserting a headed pin into said three openings,
    the head of said pin engaging the outer surface of one of said flanges,
    operating first connection means for causing said flanges to flex toward each other during assembly of said joint if the initial spacing between flanges is greater than the nominal amount,
    said first connection means including a retainer cap and at least one cap bolt extending through said retainer cap in contact with the outer surface of said retainer cap and threaded into the end of said pin, and
    operating second connection means for causing said flanges to flex away from each other during assembly of said joint if the initial spacing between flanges is less than the nominal amount,
    said second connection means including a boss portion on said retainer cap engaging said bearing assembly, a spacer between said bearing assembly and one said flange, and at least one additional cap bolt extending through said retainer cap in contact with the outer surface of said retainer cap and threaded into the other said flange.

4. A method for connecting together two frame members of a machine for movement relative to each other as in claim 3 which includes the intermediate steps of installing two retainer rings on said other frame member adjacent the two ends of said bearing assembly.

* * * * *